Nov. 6, 1962

R. DEFLANDRE 3,062,104

COOLING SYSTEM FOR ROTATABLE MACHINE
COMPONENTS, ESPECIALLY IN
MACHINE TOOLS

Filed Jan. 8, 1960

RENÉ DEFLANDRE
BY
Corey, Hart + Stemple

Nov. 6, 1962

R. DEFLANDRE 3,062,104

COOLING SYSTEM FOR ROTATABLE MACHINE
COMPONENTS, ESPECIALLY IN
MACHINE TOOLS

Filed Jan. 8, 1960

RENÉ DEFLANDRE
BY
Corey, Hart & Stemple

Nov. 6, 1962

R. DEFLANDRE 3,062,104

COOLING SYSTEM FOR ROTATABLE MACHINE
COMPONENTS, ESPECIALLY IN
MACHINE TOOLS

Filed Jan. 8, 1960

RENÉ DEFLANDRE

BY Corey, Hart & Stemple

Nov. 6, 1962  R. DEFLANDRE  3,062,104
COOLING SYSTEM FOR ROTATABLE MACHINE
COMPONENTS, ESPECIALLY IN
MACHINE TOOLS
Filed Jan. 8, 1960  5 Sheets-Sheet 5

RENÉ DEFLANDRE
BY
Corey, Hart & Stemple

United States Patent Office 3,062,104
Patented Nov. 6, 1962

3,062,104
COOLING SYSTEM FOR ROTATABLE MACHINE COMPONENTS, ESPECIALLY IN MACHINE TOOLS
René Deflandre, Paris, France, assignor to Societe dite: Derefa Etablissements pour le Developpement, Recherches et Fabrications Industrielles, Vaduz, Liechtenstein
Filed Jan. 8, 1960, Ser. No. 1,372
Claims priority, application France Jan. 31, 1959
6 Claims. (Cl. 90—11)

This invention relates to a cooling system that is especially applicable to large-capacity machine-tools in which there are large-sized, heavy, components, such as spindles, revolving at high speeds and thus generating considerable heat liable to impair machining accuracy.

The high degree of precision that is currently in demand in the machining of large-sized parts has in recent years led machine-tool manufacturers to build machine-tool units of ever increasing capacity coupled with increased dimensional accuracy in the manufacture of each component of the machine-tool. It has now been found, however, that there exists a severe limitation to the degree of machining accuracy attainable, due to the heat generated by revolving parts of the machine which creates uncontrollable dimensional variations liable to result, for example, in substantial variations in the path of a revolving tool.

It is evident that even if extreme care is exercised in the manufacture of each individual component of a complex machine-tool, a desired degree of machining accuracy can only be maintained in the absence of any deformation of such components during operation of the machine, such as deformations due to high localized elevations in temperature. For this reason, in fact, workshops in which high-precision machining operations are conducted are in many cases being air-conditioned and the air temperature in them is regulated to a narrow range, in an attempt to minimize dimensional variations due to variations in ambient temperature.

However, far larger than temperature variations normally occurring in the ambient atmosphere, are the temperature variations that are liable, in present machine-tools, to be induced within the machine-tool itself, by heat evolved as a by-product of the kinetic energy serving to drive rotatable parts of the machine, and which increases rapidly with the size and speed of the parts involved. Thus, in large-capacity tool carrying spindles such as those used in present-day milling and boring machines, considerable heat is generated within the machine head in which the spindle is journalled, and particularly in the bearings supporting the spindle as well as in the transmission gearing driving the latter. So long as such heat is evolved at a sufficiently slow and gradual rate so that it has time to dissipate throughout the metal of the spindle head, only small temperature increases are produced and the resulting dimensional variations in the head and spindle are negligible, so that machining accuracy is not affected. Such a gradual evolution of heat can in many cases be assured by providing suitable lubrication in the bearings and other parts. However recent experience has shown that the rate of lubricating fluid flow cannot be increased indefinitely to increase the rate of heat dissipation in large and fast rotating parts, because beyond a certain limit an excess of oil volume results in mechanical agitation and shear effects in the body of oil flowing through the bearings or other parts being lubricated, so that further increase in oil flow rate produces a decrease, rather than an increase, in the rate of heat dissipation and actually brings about higher temperatures than those obtaining with a lesser oil flow.

Thus, above certain definite limits in the size and speed of the rotating parts it has not been possible until now to avoid considerable and localized elevations in temperature. These in turn induce non-negligible expansions in the metal parts and the geometry of the tool supporting means is substantially altered, with corresponding impartment of the accuracy of the work performed.

The above difficulties assume especially serious proportions in present-day machine-tools which in addition to being large work at high cutting speeds and hence with large transmitted torques and at high angular and circumferential velocity of the rotating parts, such as spindles, gears and the like. Furthermore, such machines are often required to operate for long shifts without stoppage so that heat dissipation is further impeded on this count.

The tool spindles of large-capacity milling cutters and bores in particular have to be mounted in taper roller bearings because of the high radial and forces and axial thrusts that have to be taken up, and high circumferential velocities are imparted to the rollers in such bearings, resulting in considerable temperature elevations in the bearing races, especially due to friction resulting from the slippage of the larger ends of the taper rollers against the supporting flange of the inner bearing race.

It is an object of this invention to control temperature elevations occurring in machines due to rotation of components of the machine, and more especially in large-capacity and fast-rotating machine-tools. A consequent object is to enhance the precision of machining operations especially in large and heavy work.

In accordance with an aspect of the invention, there is provided, in a large-capacity machine-tool including a head and at least one rotatable component such as a tool spindle journalled in the head for high-speed rotation whereby considerable heat is generated on rotation of said component, at least one annular chamber formed in said head to surround at least a part of said rotatable component, inlet and outlet passages in the head connected with said chamber, and fluid circulating means connected with said passages for circulating a cooling fluid therethrough and through the chamber for removing part of the generated heat.

Advantageously the cooling fluid used is air, this avoiding the need for a storage reservoir; however liquid fluids, as well as gaseous fluids other than air may be used.

According to a preferred embodiment of the invention, there is provided a temperature sensing probe positioned at a selected point at which normally the temperature elevation would be greatest, and a thermostatic regulator system is provided for regulating the flow of cooling fluid in accordance with the sensed temperature to maintain this between prescribed limits.

While the cooling chambers of the invention may be associated with any revolving mechanisms, one particularly important position is around a bearing of a tool spindle of a large-capacity boring or other machine-tool; another important location is around the speed change gears in the transmission to such a spindle where such speed change gearing is mounted within the head of the machine-tool.

To improve heat dissipation by the annular chambers of the invention, especially in respect to bearings, heat radiating fins or ribs are desirably provided.

Further features of the invention will appear from the ensuing description of a preferred embodiment shown in the drawings wherein.

Figure 1:
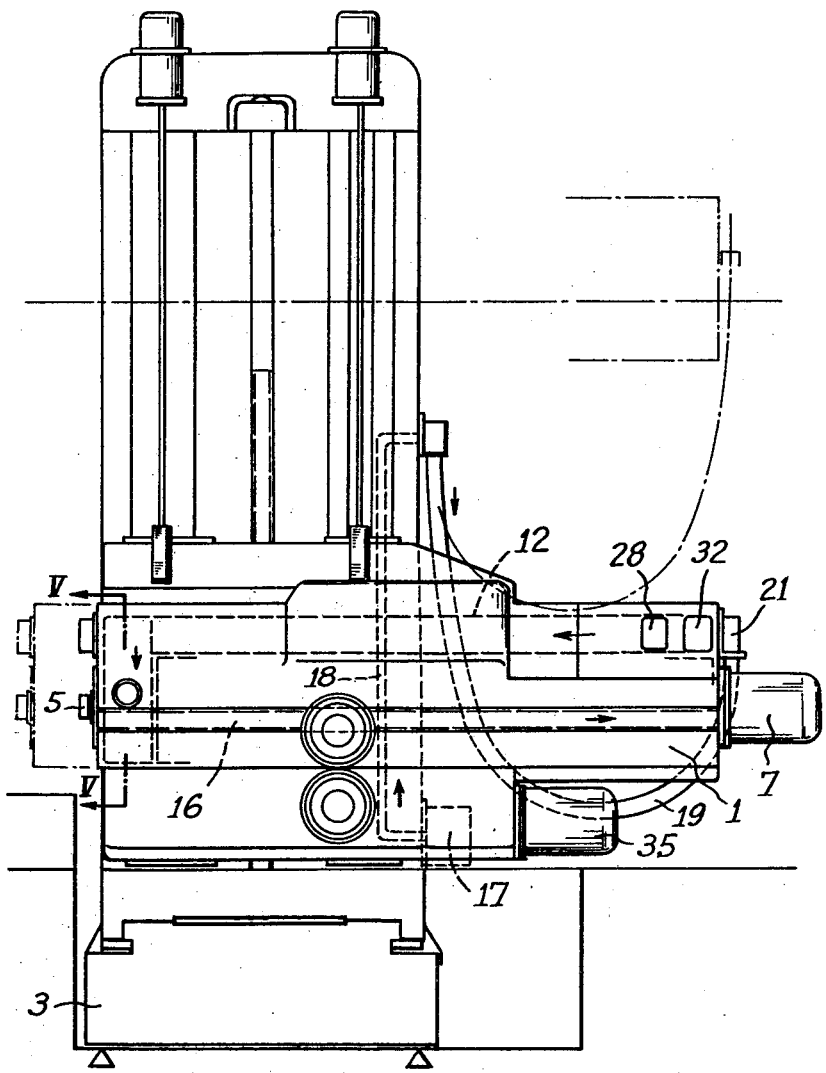
FIGURES 1, 2 and 3 are respectively a front, side and plan views of part of a milling and boring machine to which the invention has been applied.
Figure 2:
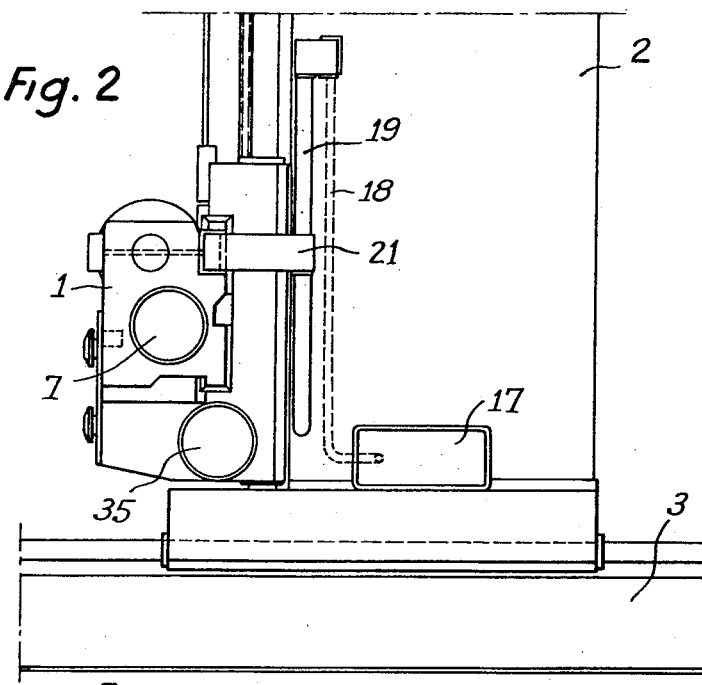
Figure 3:
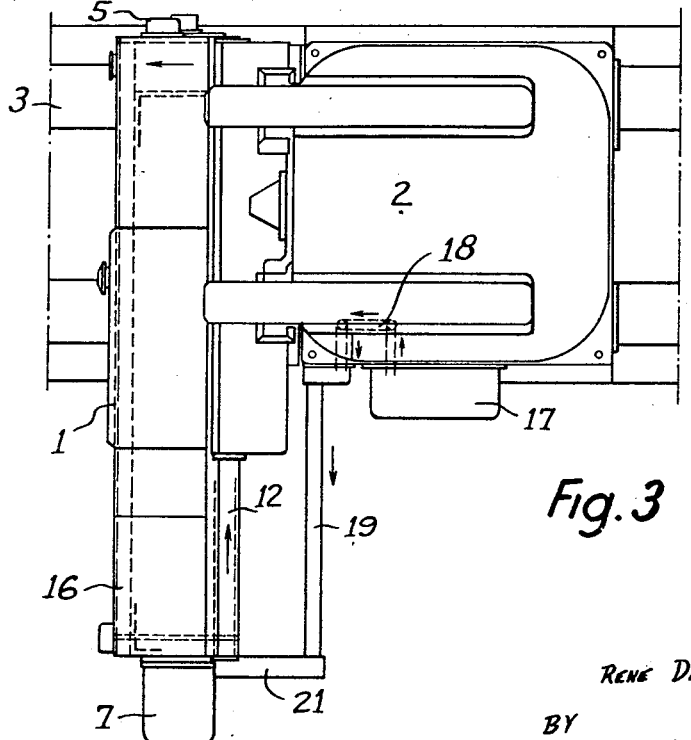
Figure 5:
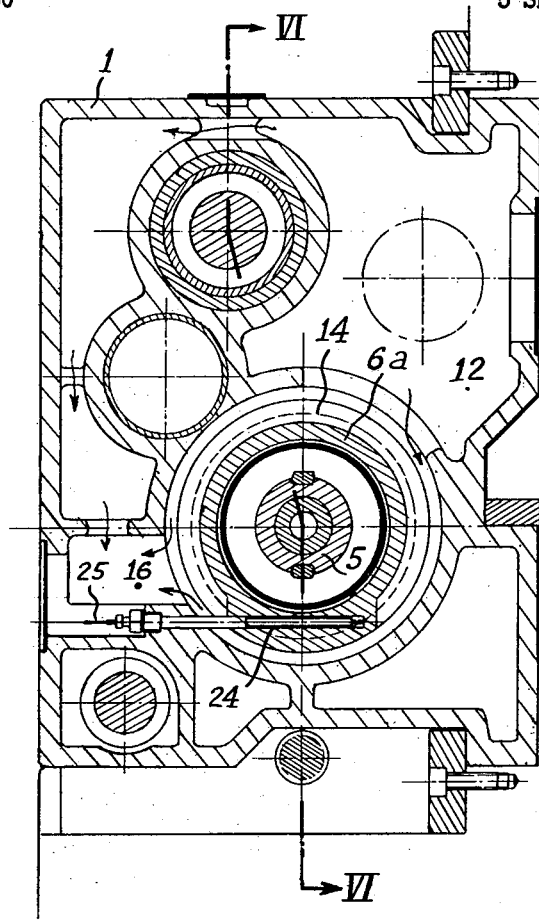
FIGURE 5 is a partial section on line V—V of FIGURE 1, on an enlarged scale.
Figure 6:
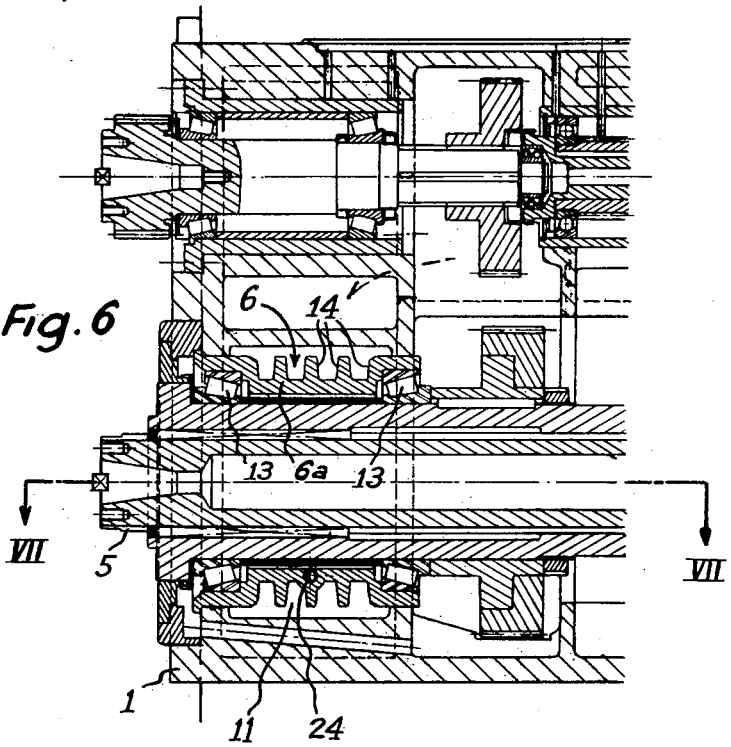
FIGURE 6 is a section on line VI—VI of FIGURE 5.
Figure 7:
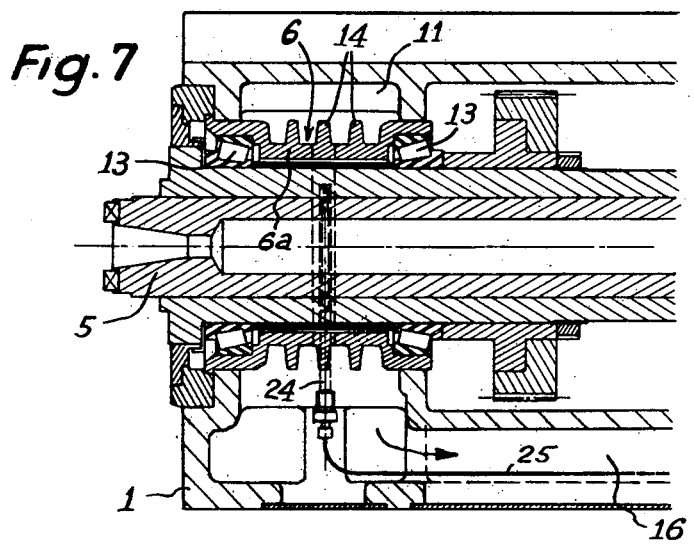
FIGURE 7 is a section on line VII—VII of FIGURE 6.

The milling and boring machine partly illustrated in FIGURES 1, 2 and 3 is generally of conventional design and includes a tool head 1 slidable in suitable vertical ways on a carriage 2 which in turn is slidably mounted on horizontal ways on a bench 3. Journalled in the head 1 is an horizontal tool carrier spindle 5 (also see FIGURES 5 to 7) supported in a front bearing generally designated 6 and in another, rear, bearing, not shown in the drawings. The spindle 5 is driven in rotation from an electric motor 7 mounted at the rear end of the head 1 (on the right, as viewed in FIGURE 1) and the drive transmission includes a gear-box, not shown, housed within the head 1.

The machine-tool shown is a large-capacity machine, so that very considerable amounts of heat are generated by the rotating parts, especially the front bearing 6 and the gears in the gear-box, as well as the motor 7. The generated head will create high elevations of temperature resulting in expansion and dimensional variations liable to affect machining accuracy.

In accordance with the invention this difficulty is overcome by the provision at appropriate locations within the machine-tool head 1 of cooling chambers, through which is circulated a cooling fluid, which in the illustrated example is air. As is best seen from FIGURES 6 and 7, one such chamber 11 is provided around the front spindle bearing 6, being formed in the cast head 1, and this chamber communicates at its periphery with an air intake duct 12 which extends axially through the head 1. Moreover, the outer annular casing 6a of the bearing 6 which surrounds the outer races of conventional antifriction bearings, preferably taper roller bearings, in which the spindle is supported, is formed with circumferential radial fins 14 to improve heat exchange with the cooling medium in the chamber. The chamber 11 further communicates with a discharge duct 16 for the heated air which likewise extends axially throughout the length of the head 1 and opens to atmosphere at the rear end of the head. This discharge duct is preferably provided with suitable heat isolation to prevent the heated air flowing therethrough from substantially raising the temperature of adjacent, normally cool portions of the head.

Figure 4:
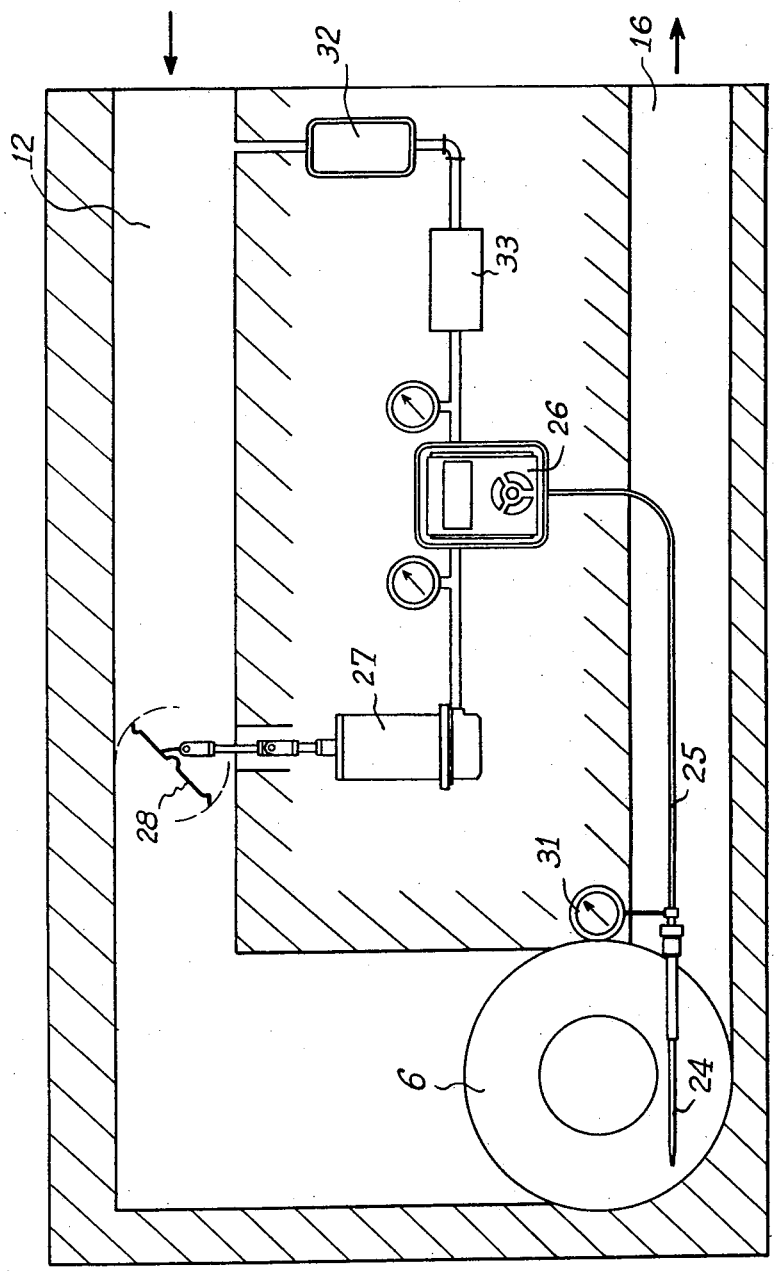
FIGURE 4 is a simplified view of the cooling fluid system as a whole.

As shown in FIGURES 2, 3 and 4, the cooling air system may include a motor-and-compressor (or pumps) group 17 mounted on the base of carriage 2, an air delivery pipe 18 connected to the compressor outlet and extending through the interior of the carriage, and a flexible hose 19 connecting the upper end of pipe 18 with the intake duct 12 of the head by way of a junction box 21 attached to the rear end of the head. The compressor or pumps 17 draws in atmospheric air through a filter in the usual way and discharges it through pipe 18, hose 19, junction or union box 21 and duct 12 into the inner cooling chambers of the head such as the chamber 11 referred to above, and thence through discharge duct 16 to atmosphere. As will readily be understood the air as it passes through the cooling chambers such as 11 removes a major proportion of the heat generated by the rotating parts, such as bearing 6, adjacent which such chambers are provided.

Automatic temperature regulating means are preferably provided for maintaining a substantially uniform temperature within the head. For this purpose there is provided at one or more suitably selected locations in the head, and preferably including the point which would normally be heated to highest temperatures in operation of the machine, such as the front spindle bearing 6, a temperature probe 24 of conventional type connected by way of a suitable line 25 to a commercially available thermostatic regulator 26 adapted through conventional relay mechanism and a servo-motor 27 to actuate a flow-regulating valve 28 mounted in the delivery duct 12, so as to adjust the cooling air flow in accordance with the temperature variations as sensed by probe 24 to maintain said temperature between prescribed limits in the well-known way. A dial instrument 31 is shown in FIG. 4 connected to line 25 for visual temperature indication. The drawing further illustrates schematically at 32 a pressure take-off adapted to sense the pressure of the cooling air and modify the operation of thermostat regulator 26 accordingly; 33 indicates an air-filter.

It will be understood that in addition to (or instead of) the single cooling chamber 11 surrounding the front bearing of the spindle other cooling chambers may be provided at strategic locations in the machine, including preferably a chamber surrounding part or parts of the gear-box within the head. Moreover, the spindle driving motor 7 and/or the feed motor 35 controlling traverse or feed displacements of the slide 2 on the bench 3 may also be provided with similar cooling means. Where such motor is mounted exteriorly of the spindle head 1, the cooling chamber therefor may assume the form of a hood surrounding the motor to provide a space for air circulation.

Figure 8:
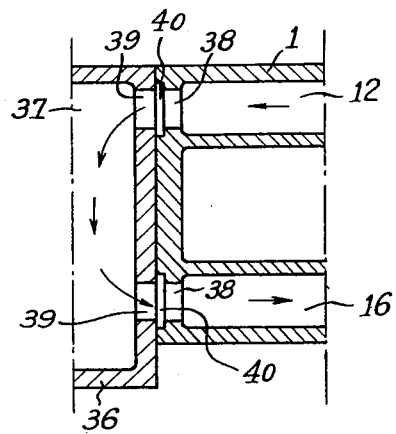
FIGURE 8 illustrates the application of the invention to a jig borer or grinder.

FIGURE 8 illustrates schematically the manner in which the invention might be applied to the case where a special machining jig 36 is adapted to be detachably secured to the front of the head 1, as in a jig-boring or -grinding machine. Such a jig may include eccentrically rotating spindle or spindles with grinding wheels or the like thereon, not shown. According to the invention, the jig casing 36 is formed with cooling recesses such as 37 and openings 39 in the flange or wall which the casing is attached to the head 1, and registering openings 38 are provided in the end flange of the head. Openings 38 respectively communicate with the air delivery and discharge ducts 12 and 16 previously referred to, and are pluggable by suitable means plugs inserted in recesses 40 when the jig housing 36 is removed. Thus with the jig in position its rotating mechanism participates in the cooling action of the system of the invention.

Various other embodiments and modifications of the invention are of course conceivable.

I claim:

1. A heavy duty machine-tool having a head, a rotary member carried by said head, means rotatably supporting said member comprising a tubular member, a pair of anti-friction bearings located in the end portions of said tubular member and having the outer races thereof mounted in said end portions, means in said head supporting said end portions of said tubular member, means in said head including said tubular member forming an annular cooling chamber in which said tubular member constitutes the inner wall thereof so as to be enclosed by and directly subjected to the cooling action of a cooling medium flowing through such chamber, means for circulating a cooling medium through said cooling chamber, and means including thermal sensitive means embedded in heat exchange relation in the material of said tubular member, for controlling the volume of the cooling medium delivered to said cooling chamber by said cooling medium circulating means without stopping the flow of such cooling medium to maintain the temperature of said bearings at a given value above ambient temperature.

2. A heavy duty machine-tool such as defined in claim 1 in which said rotary member is a tool carrying spindle.

3. A heavy duty machine-tool such as defined in claim 1, in which the intermediate portion of said tubular member between the bearing supporting end portions thereof is provided with a plurality of heat radiating fins projecting into said cooling chamber.

4. A heavy duty machine-tool such as defined in claim 1, in which said end portions of said tubular member each have a cylindrical bore of larger diameter than the opening in the intermediate body portion of such member so that shoulders are formed at the inner ends of such cylindrical bores, and in which the cylindrical outer face and one annular end face of the outer race of each bearing are respectively in intimate engagement with an associated end portion and shoulder for proper heat-transfer from said outer race to such associated end portion of said tubular member.

5. A heavy duty machine-tool such as defined in claim 4, in which said tubular member is a stationary member, and in which the end walls of said cooling chamber are located outwardly of said shoulders so that said end portions of said tubular member are enclosed by the ends of said annular cooling chamber, and including stationary annular fins located on the intermediate body portion of said tubular member between said shouders and projecting outwardly from the outer peripheral surface of such body portion into said annular chamber.

6. A heavy duty machine-tool having at a localized place thereof a rotatable component generating considerable heat on rotation thereof, tubular means forming an annular wall around said localized place so as to enclose and be in heat exchange relation with said rotatable component, said tubular means having its longitudinal axis coincident with the axis of rotation of said rotatable component, and said annular wall thereof being fixed and having a central portion positioned closely adjacent to a revolving surface portion of said component, the ends of said annular wall being spaced from said surface portion, antifriction bearings mounted between said revolving surface portion and said fixed spaced wall ends, means forming an annular chamber around said localized place and including said tubular means as the inner wall thereof to directly subject the latter to the cooling action of a cooling medium flowing through such chamber, the ends of said annular chamber overlying and enclosing said annular wall ends and bearings so that said cooling chamber is in heat exchange relation with said bearings at both ends of said annular wall, means for circulating a cooling medium through said annular chamber including a fluid supply conduit in communication with said chamber through a wall thereof, a fluid discharge conduit in communication with said chamber through a wall thereof, the places of communication of said supply and discharge conduits with said chamber being different and such that fluid fed into said chamber by said supply conduit will encircle said localized place and through said tubular means constituting the inner wall of such chamber will withdraw heat created by said rotatable component from around the latter before passing into said discharge conduit, said circulating means further including means to feed a stream of cooling material through said supply conduit, chamber and discharge conduit, and means for controlling the volume of cooling medium flowing through said supply conduit to said chamber without interrupting the flow thereof, and including a thermal sensitive means embedded in heat exchange relation in the material of said inner wall of said chamber, a flow control valve for controlling the quantity of cooling medium passing through said supply conduit to said annular chamber without stopping the flow thereof, and means controlled by said thermal sensitive means to control said flow control valve to vary the volume of cooling medium flowing to said annular chamber without stopping such flow thereof so as to maintain the temperature of said inner wall of such chamber at a given value above ambient temperature.

References Cited in the file of this patent

UNITED STATES PATENTS

| | | |
|---|---|---|
| 2,040,109 | Spence | May 12, 1936 |
| 2,055,651 | Burrell | Sept. 29, 1936 |
| 2,161,570 | Harris | June 6, 1939 |
| 2,312,292 | Tyson | Feb. 23, 1943 |
| 2,430,127 | Kronenberg | Nov. 4, 1947 |
| 2,502,907 | Welte | Apr. 4, 1950 |
| 2,606,747 | Williams | Aug. 12, 1952 |
| 2,869,428 | Ormsby | Jan. 20, 1959 |